Patented Apr. 15, 1947

2,419,093

UNITED STATES PATENT OFFICE 2,419,093

CATALYTIC HYDROGENATION OF CUMINIC ACID COMPOUNDS

Frank K. Signaigo and Caryl Sly, Wilmington, Del., assignors to E. I. du Pont de Nemours & Company, Wilmington, Del., a corporation of Delaware No Drawing. Application February 20, 1942, Serial No. 431,668

9 Claims. (Cl. 260—563)

This invention relates to a new catalytic hydrogenation reaction and, more particularly to a new and improved method for the production of thymol and menthol.

Thymol and menthol and their derivatives are important pharmaceutical and perfume chemicals and disinfectants. Heretofore these materials have been obtained chiefly from certain essential oils. Various chemical syntheses for these materials have been described but in general these involve a multiplicity of steps and have the disadvantage of producing the desired products in over-all yields which are comparatively low.

This invention has as its object the development of a new and improved catalytic process for converting the carboxyl group to a methyl group in compounds of the type hereinafter described. Another object is to provide a new and improved method for the production of thymol by catalytically converting the carboxyl group to a methyl group in a 3-hydroxycuminic acid ester. Still another object is to provide a new and improved method for the production of menthol by simultaneously converting the carboxyl group to a methyl group and saturating the aromatic nucleus in a 3-hydroxycuminic acid ester. Another object is to provide a method for the production of thymol and menthol or their derivatives in high yields and at relatively low costs. Other objects will be apparent from the following description of the invention. These objects are accomplished by the following invention which comprises converting the carboxyl group to a methyl group by catalytic hydrogenation of a compound of the formula:

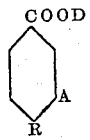

wherein A may be an hydroxyl, amino or nitro group, D may be hydrogen, a complementary anhydride radical, or an alkyl group, and R is an alkyl group having 3 or more carbon atoms, preferably isopropyl, said hydrogenation being carried out at a temperature within the range of about 200° to about 400° C. and under a hydrogen pressure of at least 1000 lbs. per sq. in. in the presence of a chromite of a hydrogenating metal or a metallic copper hydrogenation catalyst. It is preferable that this reaction be carried out with a 3-hydroxycuminic acid. In this manner thymol (1-methyl-3-hydroxy-4-isopropylbenzene) and menthol (1-methyl-3-hydroxy-4-isopropylcyclohexane) are obtained directly and in good yields. However a 3-nitro- or 3-aminocuminic acid ester may be converted to 1-methyl-3-amino-4-isopropylbenzene or 1-methyl-3-amino-4-isopropylcyclohexane in like manner and these products may be converted to thymol or menthol by treatment with nitrous acid.

The exact manner of practicing this invention will vary depending on the particular compounds processed; however, the following will illustrate its application. Parts are by weight, unless otherwise stated.

Example I 3-hydroxy-4-isopropylbenzoic acid (3-hydroxycuminic acid) obtained by successive nitration, reduction and diazotization of cuminic acid is esterified with absolute ethyl alcohol and ethyl 3-hydroxycuminate is isolated, washed with sodium bicarbonate solution, and dried. A 96% yield of the ester (melting point of 75° to 77° C.) is obtained. Seventy-three parts of ethyl 3-hydroxycuminate, 100 parts of dioxane, 5 parts of calcium carbonate and 10 parts of barium-promoted copper chromite catalyst are agitated together in a shaking autoclave at 270° C., under a hydrogen pressure of 1800 to 2800 lbs. per sq. in. for 3.25 hours, at which time hydrogen absorption has ceased. After removing the catalyst by filtration and the solvent by distillation, the colorless, liquid product is fractionally distilled through an efficient fractionating column at 16.5 mm. pressure. There is obtained 10.8 parts of a menthol fraction distilling at 99° to 115° C. corresponding to a 17% yield of menthol, and 39.6 parts of a thymol fraction distilling at 115° C. corresponding to 65% yield of thymol. This represents an over-all yield of thymol and menthol from 3-hydroxycuminic acid of 82% of theory.

Example II

Fifteen parts of ethyl 3-aminocuminate, 100 parts of dioxane and 10 parts of barium-promoted copper chromite catalyst are mixed and agitated in a shaking autoclave at 270° C., and 1800 to 2000 lbs. hydrogen pressure per sq. in. for 3 hours, when hydrogen absorption has ceased. Substantially quantitative hydrogenation of the carboxyl groups to methyl groups occurs, accompanied by partial hydrogenation of the ring. After removal of the catalyst by filtration and the solvent by distillation, fractionation of the hydrogenated product yields 10 parts of a mixture of thymyl and menthyl amines, equivalent to a yield of 75% of theory. The ratio of thymyl amine to menthyl amine is in substantially the same proportions as the thymol and menthol yield of Example I.

It will be apparent from the above examples that the method of the present invention is applicable to the hydrogenation of compounds of the general formula:

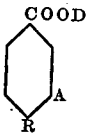

wherein A may be an hydroxyl, amino or nitro group, D may be hydrogen, a complementary anhydride radical, or an alkyl group, and R is an alkyl group having 3 or more carbon atoms, preferably isopropyl. Specific examples of compounds operable in the process of this invention include ethyl, propyl, amyl, isoamyl, octyl, and dodecyl, 3-hydroxy-, 3-amino-, and 3-nitrocuminates; the ethyl, propyl, isopropyl, octyl and dodecyl esters of 4-propyl, butyl, amyl, isoamyl, octyl, dodecyl, etc., 3-hydroxy-, 3-nitro-, and 3-aminobenzoic acids.

The process of this invention is particularly useful for synthesizing thymol and menthol from 3-hydroxycuminic acid and thymyl amine and menthyl amine from 3-nitro- or 3-aminocuminic acid and in these syntheses it is preferred to use esters, and, particularly the monohydric alcohol esters of the cuminic acid as higher yields of the desired products are obtained than from the free acid or anhydride. In practicing the invention, therefore, the acid in question is first esterified and the resulting ester then hydrogenated in the presence of suitable hydrogenation catalysts. Many esters may be employed such as the methyl, ethyl, propyl or butyl esters. The methyl esters are not as valuable for this purpose as the higher esters since the methyl alcohol formed is subject to gaseous decomposition and therefore not as readily recoverable. Propyl, butyl, or higher esters ordinarily involve more expensive materials and increase production costs. From the standpoint of efficiency and economy of operation it is preferred to employ ethyl esters of the acids under consideration.

In practicing this invention, any catalyst which is selective for reducing a carboxyl group to a methyl group can be used. The catalysts which we have found useful are the chromites of hydrogenating metals such as the chromites of copper, nickel, cobalt or iron and metallic copper containing catalysts. The chromite catalysts can be modified by the addition of oxides or carbonates of alkali metals, or alkaline earth metals. Other suitable promoters are compounds containing an alkali or alkaline earth metal combined with the acid radical of an oxygen-containing acid such as barium or calcium chromate. It is especially preferred to employ a copper-containing chromite catalyst, with the addition of a small amount of an alkaline earth substance. Of the metallic copper containing catalysts, the preferred class are those of the alloy-skeleton type prepared by the process of the co-pending application of Lazier and Signaigo, Ser. No. 341,464, filed June 11, 1940. As set out in said application, alloy-skeleton copper catalysts are prepared by treating a finely divided alloy containing copper and an alkali-soluble metal with an excess of caustic alkali solution. In one preferred method of preparing said catalysts, a copper-aluminum alloy, preferably containing about 50 parts by weight of copper, is prepared by conventional methods and reduced to a fine powder which will pass through a 325 mesh screen. 227 parts of the alloy is suspended in 1000 parts of water and the mixture heated to boiling with stirring. To this suspension is added slowly over a period of 2 hours a solution containing 227 parts of caustic soda dissolved in 375 parts of water. The reaction is quite vigorous during the first 20 minutes, and the addition is carried on slowly to avoid losses through foaming. Thereafter, the caustic solution is added rapidly during the remainder of the reaction period. When all of the caustic has been added the suspension of finely divided metal is digested at the boiling point for a period of 4 hours, the sludge is allowed to settle, and the supernatant liquid decanted. The sludge is again slurried with fresh cold water and the process repeated several times to remove most of the dissolved sodium aluminate. A fresh solution of 227 parts of sodium hydroxide in 1000 parts of water is then added and the mixture boiled with stirring for 4 hours. The caustic solution is again decanted from the finely divided copper powder, which is thoroughly washed with water until the last trace of caustic is removed. The catalyst powder is then preferably transferred to alcohol and washed until free from water. The freshly prepared catalyst can be stored under absolute alcohol or, if desired, can be dried and stabilized for handling in air by exposure to a limited amount of air at low temperatures; i. e., temperatures below 50° C. It is to be understood, however, that alloy-skeleton copper catalysts suitable for use in the practice of this invention can be prepared from alloys of copper with alkali-soluble metals in accordance with any of the methods known to the prior art. The alloys may contain from 10 to 90 parts by weight of copper and 90 to 10 parts of alkali-soluble metals, such as aluminum, zinc and tin. The alkali-soluble metals may be employed as a single component of the alloy or in various combinations with various amounts of each.

The reaction temperature employed in carrying out the process of this invention will depend to some extent on the temperature required to activate the catalyst. The process is operative within the temperature range of about 200° C. to about 400° C. If nickel-containing catalysts are employed, the preferred temperature will be in the lower brackets of this temperature range. Copper chromite and barium-promoted copper chromite, which are the preferred catalysts, appear to be most effective in the temperature range of about 250° C. to about 300° C.

The hydrogen pressure employed in carrying out the process of this invention can vary from 1000 lbs. per sq. in. to as high as 4000 lbs. per sq. in. However, it is preferable to operate within the range of 1800 to 2800 lbs. per sq. in.

In carrying out the process of this invention, a certain amount of ring hydrogenation occurs in addition to the conversion of the carboxyl group to a methyl group. This will vary to some extent with the catalyst employed. Higher yields of menthol or menthyl derivatives in relation to thymol and thymyl derivatives are obtained with a nickel chromite catalyst than with copper chromite or copper chromite promoted with barium or with zinc chromite.

Employing barium-promoted copper chromite under the conditions described in the above examples, the proportion of thymyl to menthyl compounds or of carboxyl hydrognation to ring hydrogenation is in the ratio of about 2.5 to 1.

Larger yields of thymyl compounds with respect to menthyl compounds may be obtained by stopping the hydrogenation at an earlier stage. Longer periods of hydrogenation will result in higher yields of ring hydrogenated menthyl derivatives.

As many apparently widely different embodiments of this invention may be made without departing from the spirit and scope thereof, it is to be understood that this invention is not to be limited to the specific embodiments shown and described.

We claim:

1. A process for producing menthyl and thymyl compounds comprising catalytically hydrogenating a compound of the general formula

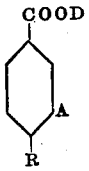

wherein A is selected from the group consisting of hydroxyl, nitro and amino groups, D is selected from the group consisting of hydrogen, the complementary radical of the formula

and an alkyl group, and R is an isopropyl group, at a temperature within the range of from about 200° C. to about 400° C., under a hydrogen pressure of at least 1000 pounds per square inch, and in the presence, as a catalyst, of a chromite of a metal selected from the group consisting of copper, nickel, cobalt, and iron.

2. The process in accordance with claim 1 characterized in that the reaction is carried out at a temperature of about 250° to about 300° C.

3. The process in accordance with claim 1 characterized in that the reaction is carried out under a hydrogen pressure of about 1800 to about 2800 lbs. per sq. in.

4. The process in accordance with claim 1 characterized in that the cuminic acid substance is an ester of 3-hydroxycuminic acid.

5. The process in accordance with claim 1 characterized in that the cuminic acid substance is a lower alkyl ester of 3-hydroxycuminic acid.

6. The process in accordance with claim 1 characterized in that the cuminic acid substance is an ester of 3-aminocuminic acid.

7. The process in accordance with claim 1 characterized in that the cuminic acid substance is a lower alkyl ester of 3-aminocuminic acid.

8. The process which comprises catalytically hydrogenating the ethyl ester of 3-hydroxy-4-isopropylbenzoic acid at a temperature within the range of about 200° C. to about 400° C., and under a hydrogen pressure within the range of 1800–2800 pounds per square inch in the presence of a copper-containing chromite catalyst.

9. The process which comprises catalytically hydrogenating the ethyl ester of 3-amino-4-isopropylbenzoic acid at a temperature within the range of about 200° C. to about 400° C. and under a hydrogen pressure within the range of 1800 to 2800 pounds per square inch in the presence of a copper-containing chromite catalyst.

FRANK K. SIGNAIGO.
CARYL SLY.

REFERENCES CITED

The following references are of record in the file of this patent:

UNITED STATES PATENTS

| Number | Name | Date |
|---|---|---|
| 1,280,940 | Andrews | Oct. 8, 1918 |
| 1,306,512 | Andrews | June 10, 1919 |
| 1,737,272 | Schoeller | Nov. 26, 1929 |

FOREIGN PATENTS

| Number | Country | Date |
|---|---|---|
| 239,527 | British | Jan. 21, 1926 |
| 273,684 | British | Dec. 15, 1928 |
| 293,001 | British | Sept. 23, 1929 |